US007920823B2

(12) United States Patent
Hassan et al.

(10) Patent No.: US 7,920,823 B2
(45) Date of Patent: Apr. 5, 2011

(54) SYSTEM CAPABILITY DISCOVERY FOR SOFTWARE DEFINED RADIO

(75) Inventors: Amer A. Hassan, Kirkland, WA (US); Vishesh M. Parikh, Redmond, WA (US); Thomas W. Kuehnel, Seattle, WA (US); Deyun Wu, Redmond, WA (US); Christian Huitema, Clyde Hill, WA (US); David Jones, Seattle, WA (US); Andrew Baron, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1061 days.

(21) Appl. No.: 11/635,869

(22) Filed: Dec. 8, 2006

(65) Prior Publication Data

US 2008/0137548 A1 Jun. 12, 2008

(51) Int. Cl.
*H04H 20/74* (2008.01)

(52) U.S. Cl. ............... 455/3.02; 455/180.2; 455/435.2; 455/550.1

(58) Field of Classification Search .............. 455/3.02, 455/12.01, 179.1, 180.1, 180.2, 188.1, 188.2, 455/435.1, 435.2, 550.1, 552.1, 553.1
See application file for complete search history.

(56) References Cited

U.S. PATENT DOCUMENTS

| | | | |
|---|---|---|---|
| 6,937,877 B2 | 8/2005 | Davenport | |
| 7,016,668 B2 | 3/2006 | Vaidyanathan et al. | |
| 7,043,023 B2 | 5/2006 | Watanabe et al. | |
| 2002/0082044 A1* | 6/2002 | Davenport | 455/552 |
| 2002/0137514 A1* | 9/2002 | Mitsugi et al. | 455/436 |
| 2003/0050055 A1 | 3/2003 | Ting et al. | |
| 2003/0067902 A1 | 4/2003 | Skeba | |
| 2003/0219034 A1 | 11/2003 | Lotter | |
| 2005/0027789 A1 | 2/2005 | Luo et al. | |
| 2005/0227692 A1 | 10/2005 | Murakami | |
| 2005/0243952 A1 | 11/2005 | Li | |
| 2006/0034259 A1* | 2/2006 | Matsuda | 370/352 |
| 2006/0045212 A1 | 3/2006 | Ishii et al. | |
| 2006/0130053 A1* | 6/2006 | Buljore et al. | 717/173 |
| 2006/0161314 A1 | 7/2006 | Honmura | |
| 2006/0199550 A1 | 9/2006 | Ishikawa et al. | |
| 2006/0211387 A1 | 9/2006 | Pisek et al. | |
| 2006/0215556 A1 | 9/2006 | Wu et al. | |
| 2006/0287001 A1* | 12/2006 | Budampati et al. | 455/552.1 |

FOREIGN PATENT DOCUMENTS

JP 2002-335186 A 11/2002

OTHER PUBLICATIONS

International Search Report and Written Opinion for International Application Serial No. PCT/US2007/085511 mailed Dec. 23, 2008.
Hentschel, et al., The Digital Front-End of Software Radio Terminals, IEEE, 1070-9916, pp. 6-12, Aug. 1999.
Yoshida, et al., "Broadband RF Front-End Software Execution Procedure in Software-Defined Radio," IEEE, O-7803-5435-4, pp. 2133-2137, VTC '99.
Arkesteijn, et al., "An Analogue Front-End Architecture for Software Defined Radio," MESA Research Inst., IC-Design Group, pp. 165-168.

* cited by examiner

*Primary Examiner* — Nhan Le
(74) *Attorney, Agent, or Firm* — Wolf, Greenfield & Sacks, P.C.

(57) ABSTRACT

Capability checking to examine a computing device's capabilities to determine if the device supports a software defined radio to communicate according to a specific wireless protocol. Applicants have appreciated that as the reliance on software defined radio increases, numerous potential options may be available to a user for performing wireless communication. Applicants have appreciated the desirability of providing the ability to discover the capabilities of a user's computer to determine whether it is capable of supporting one or more wireless protocols.

20 Claims, 6 Drawing Sheets

US 7,920,823 B2

SYSTEM CAPABILITY DISCOVERY FOR SOFTWARE DEFINED RADIO

FIELD OF THE INVENTION

The present invention relates to methods and apparatus for determining the capabilities (e.g., hardware and software) of a computer system with regard to software defined radio.

BACKGROUND OF THE INVENTION

Wireless technology for computing systems is constantly changing and evolving. New wireless protocols are released each year directed to solving new problems or more efficiently solving old problems. As new technologies are released implementing new protocols, demand grows for computing devices that support more and more protocols.

Devices capable of communicating using one or more wireless technologies are referred to as radios. In early radio implementations, support for more protocols required more hardware to support those protocols since each protocol depended on specific hardware—e.g., amplifiers, antennas, filters, etc.—for support. More hardware in turn required more space and more power, and possibly even more hardware to deal with signal interference between components.

Efficiency considerations have led to the development of new radio implementations that move some functions from being performed in hardware to being performed in software. These new implementations are known as software defined radio (SDR). In some cases, multiple wireless communication protocols can be supported by one set of hardware.

SUMMARY OF THE INVENTION

Applicants have appreciated that as the reliance on SDR increases, numerous potential options may be available to a user for performing wireless communication. Applicants have appreciated the desirability of providing the ability to discover the capabilities of a user's computer to determine whether it is capable of supporting one or more wireless protocols.

In view of the foregoing, embodiments of the present invention are directed to a process for checking a computing device's capabilities (including, for example, hardware and/or software capabilities) to determine if it supports a specific wireless protocol. The techniques for determining the computing device's compatibility may include comparing lists of protocol requirements to lists of system capabilities and/or generating test signals by the system according to the protocol.

In one illustrative embodiment, first information is obtained that includes requirements for device communication according to a wireless communication protocol, and second information is obtained about at least one capability of a computing device, the second information being sufficient to determine whether the computing device is capable of implementing a software defined radio that can communicate according the wireless communication protocol. Based on the first and second information, it is determined whether the computing device is capable of implementing a software defined radio that can communicate according the wireless communication protocol.

In another embodiment, a computer is provided that includes programmable circuitry, software encoded on a computer-readable medium to program the circuitry to implement a software defined radio, and a verification module to determine whether the software defined radio is able to communicate according to a specified wireless communication protocol.

DETAILED DESCRIPTION

Applicants have appreciated that conventional implementations of software defined radio have been limited in scope. In these implementations, some functionality has been moved from hardware into software, such as selection of frequency band and power level, but these still rely on specific hardware to enable radio communication and connectivity.

Applicants envision SDR systems evolving to have increasingly-reduced reliance on specialized hardware. In Applicants' vision, generic, extensible hardware will be used to support many protocols, possibly with widely varying protocols. The generic hardware may be supported by an operating system (OS) that will take on a greater role in handling data that has been received or is to be sent. Rather than the simple, conventional implementations, the OS—or other suitable software—may handle all parts of the wireless protocol, including selection of bandwidth, carrier separation, and medium access control, each of which is discussed further below.

In conventional implementations of hardware radio or SDR, new hardware typically is necessary for a computing device to support new protocols. In SDR as Applicants envision it, however, a computing device's functionality can be extended by, for example, downloading software to implement a selected wireless protocol from a website, or, in another example, installing software implementing a wireless protocol from a disk or other suitable computer-readable medium. It should be appreciated that these examples are merely illustrative, as any suitable method for copying data to a computer-readable media accessible by the computing device may be used to load software defining a wireless protocol onto a computer. Once software implementing a wireless protocol is installed on a user's computing device and enabled by a user, the computing device's OS may work with SDR drivers to configure hardware and software to send and receive signals according to the wireless protocol.

Applicants have appreciated that as the reliance on SDR increases, numerous potential options may be available to a user for performing wireless communication. Some of those options may be supported by the user's computer, while others may not. Therefore, Applicants have appreciated the desirability of providing the ability to discover the capabilities of a user's computer to determine its ability to support a particular wireless protocol.

In view of the foregoing, one embodiment of the present invention is directed to a method for discovering the capabilities of a user's computer and determining whether a particular wireless protocol is supported by those capabilities.

Figure 1:
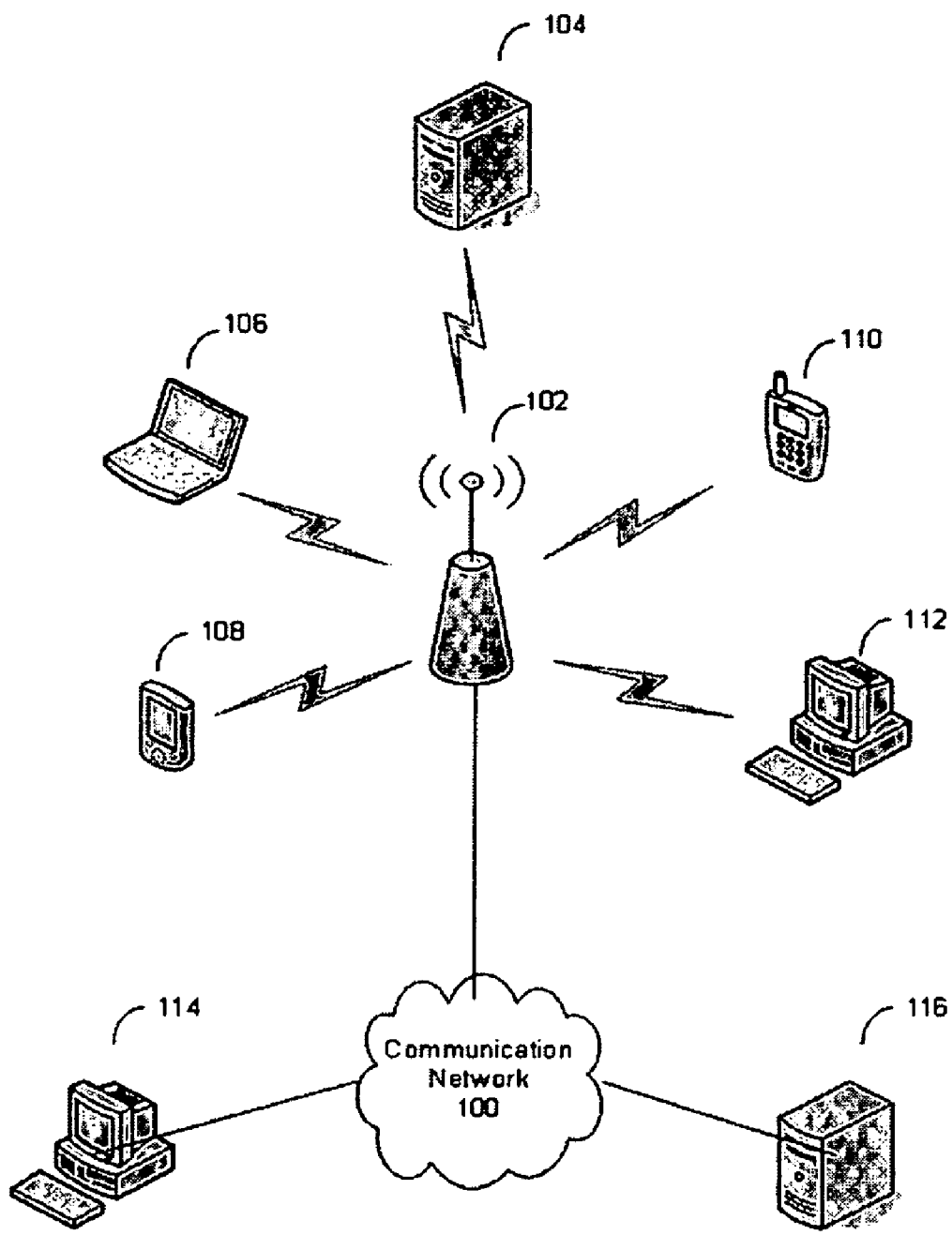
FIG. 1 is a diagram of an illustrative computer system environment in which embodiments of the invention may be implemented.

The aspects of the present invention described herein can be implemented on any of numerous computer system configurations and are not limited to any particular type of configuration. FIG. 1 illustrates one example of a computer system on which aspects of the invention can be implemented, although others are possible.

The computer system of FIG. 1 includes communication network 100, wireless access point 102, wireless computing devices 104-112, and wired computing devices 114 and 116. Communication network 100 can be any suitable communication medium or media for exchanging data between two or more computers (e.g., a server and a client), including the Internet. The wireless client devices can be any suitable computing device with wireless communication capabilities. Several exemplary mobile computing devices are shown, including laptop 106, personal digital assistant 108, and smart phone 110. In addition, typically stationary devices can be enabled for wireless communication, such as server 104 and computer terminal 112. Each of these mobile and stationary devices is in a state of, or capable of being in a state of, wireless communication with wireless access point 102 connected to communication network 100. This wireless communication allows the computing devices to exchange data with one another or, through communication network 100, with wired devices 114 and 116.

As mentioned above, the embodiments of the invention described herein are not limited to being practiced with the exemplary system shown in FIG. 1, and can be employed on systems employing any number of wireless access points and/or computing devices. In addition, while FIG. 1 shows the computing devices in wireless communication with wireless access point 102, it should be appreciated that embodiments of the invention may operate in networks wherein the computing devices communicate with one another directly and not through an access point. Also, while FIG. 1 includes communication network 100 with wired devices 114 and 116, embodiments of the invention can be used in systems that do not include a wired network.

Figure 2:
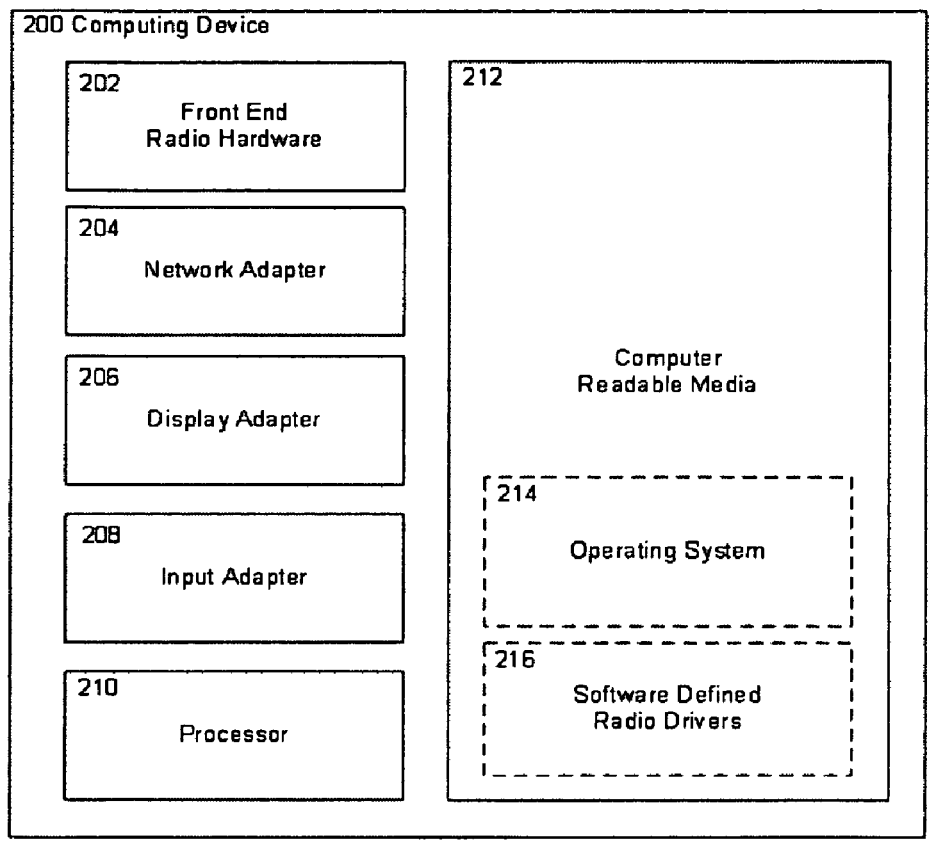
FIG. 2 is an exemplary computing device that may be used in accordance with embodiments of the invention.

FIG. 2 schematically shows an illustrative computing device 200 that may be used in accordance with one or more embodiments of the invention. FIG. 2 is intended to be neither a depiction of necessary components for a computing device to operate with embodiments of the invention nor a comprehensive depiction. Computing device 200 comprises front end radio hardware 202 to communicate wirelessly, e.g., with wireless access point 102 or with other devices. Device 200 also comprises a network adapter 204 to communicate over a computer network using other (possibly non-wireless) methods, a display adapter 206 to display information to a user of the device, and an input adapter 208 to receive commands from the user. Device 200 further comprises computer-readable media 212 for storing data to be processed and/or instructions to be executed by a processor 210. Processor 210 enables processing of data and execution of instructions. The data and the instructions may be stored on the computer-readable media 212 and may, for example, enable communication between components of the computing device 200. The data and instructions may comprise an operating system 214 and software defined radio drivers 216. SDR drivers 216 may comprise data and instructions to carry out many functions typically done in hardware-implemented radios. The functions performed by drivers 216 may complement the functions of front end radio hardware 202, such that all desired functions may be performed by the combination of hardware and software.

Front end radio hardware 202 may be any suitable radio hardware performing any combination of functions. These functions may include modulation (i.e., mixing a data signal into a high frequency transmission signal), filtering (i.e., parsing data out of a received signal), analog-to-digital or digital-to-analog conversion, signal generation (i.e., transmitting the data), etc. Front end 202 may be implemented to perform a minimum of the required functions that need to be performed at the hardware level, with the remaining functions being implemented by SDR drivers 216. Although the present function is not limited to use with systems, that decide the responsibilities of the hardware and software in any particular way. Front end 202 may comprise an antenna, a programmable radio-frequency waveform generator/decoder that spans a wide radio spectrum, an array of fast analog to digital converters, and/or serializers/de-serializers to convert analog data into computer-processable bytes and vice versa. A set of tunable analog filters may also be employed to comply with mandated spectrum masks. These hardware components are merely illustrative, as invention not limited to use on systems having any particular hardware.

SDR drivers 216, in addition to performing radio functions, may transmit control instructions to the tunable circuitry of front end 202 to customize the hardware of the front end 202 according to a particular wireless protocol. As one example, a user may have selected to enable communication having a bandwidth of 83 MHz according to the Institute of Electrical and Electronics Engineers' (IEEE) 802.11b standard. As a further example, the front end 202 may have a configurable bandwidth with a range of 200 KHz to 500 MHz. In this case, the SDR drivers 216 may send a control signal (in any suitable manner) to the waveform generator of front end 202 to generate signals having, among other characteristics, a total bandwidth one-sixth of the front end's capacity (namely, the 83 MHz established by the IEEE 802.11b standard). It should be appreciated that embodiments of the invention are not limited to use with SDR's that have a configurable bandwidth with the above-desired range, nor to SDRs that configure hardware according to any specific technique, as the embodiments of the invention can be used with SDRs that tune the hardware components in any suitable manner.

It should be appreciated that one embodiment of the invention is directed to use with a computing device having programmable circuitry (e.g., the front end hardware 202 and the SDR drivers 216) that is programmable by control instructions to generate and/or receive signals according to a wireless protocol. Again, this programmable circuitry can take any suitable form and include any collection of directly programmable circuitry (e.g., a programmable processor) and circuitry that interacts with directly programmable circuitry to enable communication according to a wireless protocol.

It should be appreciated that the embodiments of the present invention described herein are not limited to being practiced with the type of computing device illustrated in FIG. 2, and that embodiments of the invention can be practiced with any suitable computing device. The front end 202 and adapters 204-208 may be implemented as any suitable hardware, software, or combination thereof, and may be implemented as a single unit or multiple units. Similarly, computer-readable media 212 may be implemented as any medium or combination of media for storing data and instructions for access by a processing device.

As discussed above, in one embodiment of the invention, capability checking is provided for determining the capabilities of the computing device 200 (e.g., front end 202 and operating system 214, including SDR drivers 216) and the compatibility of the computing device with a given wireless protocol. It should be appreciated that this determination can be done in any suitable manner. Exemplary discovery techniques are disclosed herein, but embodiments of the invention are not limited to any particular implementation technique.

Figure 3:
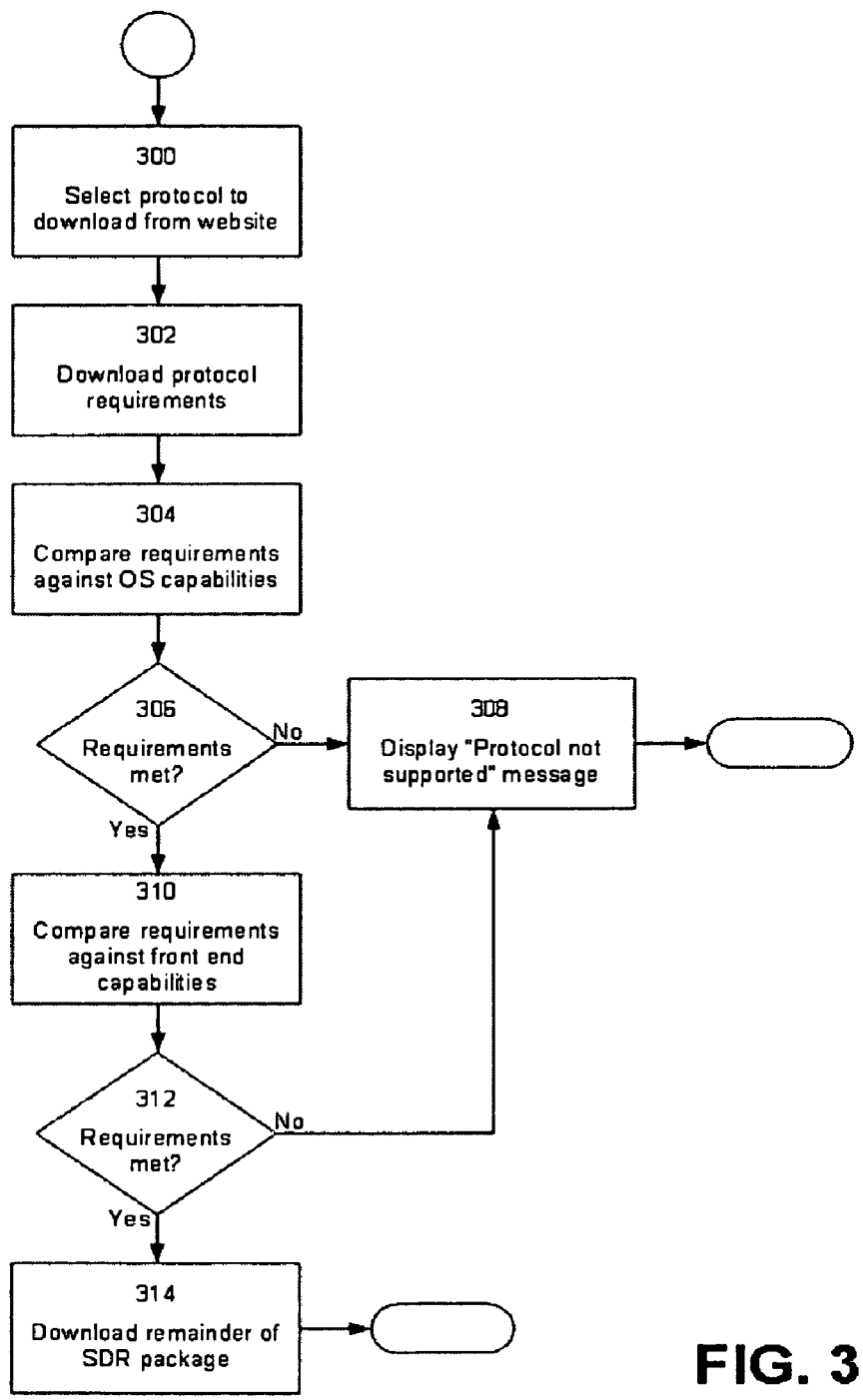
FIG. 3 is a flowchart of an illustrative process of discovering, in accordance with one embodiment of the invention, whether a specified wireless protocol is supported by a computing device's software and hardware.

FIG. 3 illustrates a discovery technique implemented by one embodiment of the invention for use with a website from which software implementing various wireless protocols may be downloaded. In act 300, a user selects software to download from the website. In act 302, a file comprising the requirements of the protocol is downloaded to the computing device. This file may comprise information describing the minimum requirements necessary to determine whether the computing device supports the protocol. In act 304, the requirements are compared against the capabilities of the operating system 214. The capabilities of the OS may either be detected at the time of comparison or detected in advance and stored for later comparison. Exemplary requirements of the OS will be discussed below. In act 306, the capability checking tool determines whether the OS has met the requirements of the protocol. If not, in act 308 a message is displayed informing the user that the device does not support the selected protocol and the tool terminates. At this time, the user may restart the process in act 300 by selecting another protocol from the website.

If it is determined in act 306 that the OS requirements are met, the process proceeds to act 310 where the requirements for the wireless protocol are compared to the capabilities of the front end 202. The capabilities of the front end may be detected at the time of comparison or detected in advance and stored for later comparison. Any suitable technique may be used for detecting the capabilities of the hardware. For example, Plug and Play, which is a popular, conventional service for interrogation of hardware by an operating system to identify the hardware and its characteristics, is an exemplary technique, although this is merely illustrative as other techniques are possible. Hardware venders can be made aware of the capabilities to be discovered and may make interfaces to provide information about the capabilities of the hardware in any suitable manner. Exemplary requirements of the hardware will be discussed below.

In act 312, the process determines whether the requirements of the protocol have been met by the front end 202. If not, the tool proceeds to act 308, wherein a message is displayed informing the user that the device does not support the selected protocol and the tool terminates.

If the requirements are met, the process proceeds to act 314, where the remainder of the software implementing the wireless protocol is downloaded to the computing device. Information comprising the remainder of the software may vary between different embodiments of the invention and different wireless protocols. In some examples, the information may include usernames, passwords, and quality of service settings. The downloaded information is not limited to any specific information, but may be any information that the device may use in communicating according to the wireless protocol.

In alternative embodiments, rather than downloading additional information in act 314, the process could simply display a message to the user confirming that the selected protocol is supported by the user's system.

In the embodiment of FIG. 3, capability checking is initiated in response to a particular protocol being selected for installation from a medium or media storing software implementing one or more wireless protocols. The capability checking process is not limited in this respect and could detect a system's capabilities in response to other events. For example, a user may wish to know if a protocol is supported without selecting it to install. In a further example, a user may want to know which of a plurality of protocols are supported by the computing device.

For the embodiment wherein capability checking is initiated in response to a request to install software to enable a SDR to wirelessly communicate using a protocol, any suitable technique for storing information for local and/or remote access may be implemented. In one embodiment, users will access a website for downloading protocol-enabling software to their computing devices. An exemplary website of this embodiment is one that comprises a data store that stores not only a list of available protocols and enabling software (e.g., for lease or purchase, or for free), but also common uses of the protocols and geographic locations in which the protocols are commonly used.

As an example of the use of a website offering usage and location information, a user in one country (e.g., the United States of America) could be preparing for a business trip to another country (e.g., China) and know that it would be advantageous to have wireless access to the Internet through a computing device while traveling. The user may access the website using the computing device and via any suitable user interface indicate that he or she will be traveling through China and would like wireless access to the Internet. The website may then return a list of available protocols implemented in China. Examples of possible protocols may include cellular network protocols for Wireless Wide Area Network access, and popular Wireless Local Area Network protocols used in hotels such as those the user may be staying at. The user may then select a protocol and seek to install software to configure the computing device (using SDR technology) to be able to communicate according to that protocol. Various installation forms are possible. For example, the user may lease use of the protocol for a certain period—the length of the trip—or may purchase unlimited use of the software, or the website may offer software for free unlimited use, rather than for purchase.

In response to a selection, techniques described herein can be run to see if the capacity device is capable of supporting the selected protocol. Such a process is useful for the user, since if the device is not capable, the user can find out in advance of needing to use the protocol (e.g., before arriving in China and trying to access the Internet). Having compatibility information, users can plan accordingly by, for example, procuring another device that will be capable of supporting the desired protocol.

It should be appreciated that use of a website for downloading software to program SDR to support wireless protocols in the embodiment of FIG. 3 is merely an illustrative technique for installing new wireless protocol capabilities on a computing device. Any suitable technique may be implemented. In an one embodiment, users may access a computer-readable medium such as a Compact Disc (CD) or a Digital Versatile Disc (DVD) having stored thereon computer-executable instructions for guiding the user through a selection process for accessing software implementing one or more wireless protocols also stored on the disc. In an alternate embodiment, rather than selecting software implementing a protocol from a list or database, software implementing a particular protocol may be provided to a user on a computer-readable medium, and may be directly input to the capability checking tool to confirm that it is supported by the computing device (e.g., the user's OS and/or front end).

It should be appreciated that the sequence of acts in the embodiment of FIG. 3 is merely illustrative, as other sequences are possible. For example, rather than checking the OS capabilities first, the front end capabilities may be checked first. Other alternatives are possible. For example, in one embodiment, rather than downloading a preliminary file outlining only the requirements of the wireless protocol, the software to configure the SDR on the device to communicate according to the protocol could be downloaded in an alternative act 302. This embodiment may, therefore, not execute an act corresponding to act 314 of the illustrative embodiment of FIG. 3.

It should be appreciated that the capability checking aspect of the invention is not limited to running on the user's computing device that is being checked. Any suitable technique for comparing requirements of the protocol with capabilities of a client device may be implemented. In one embodiment, a capability checking tool may execute on a web server comprising a website such as the one described above. For example, the OS and front end capabilities of a computing device may be uploaded to the server for remote comparison instead of downloading a file for a local comparison.

Figure 4:
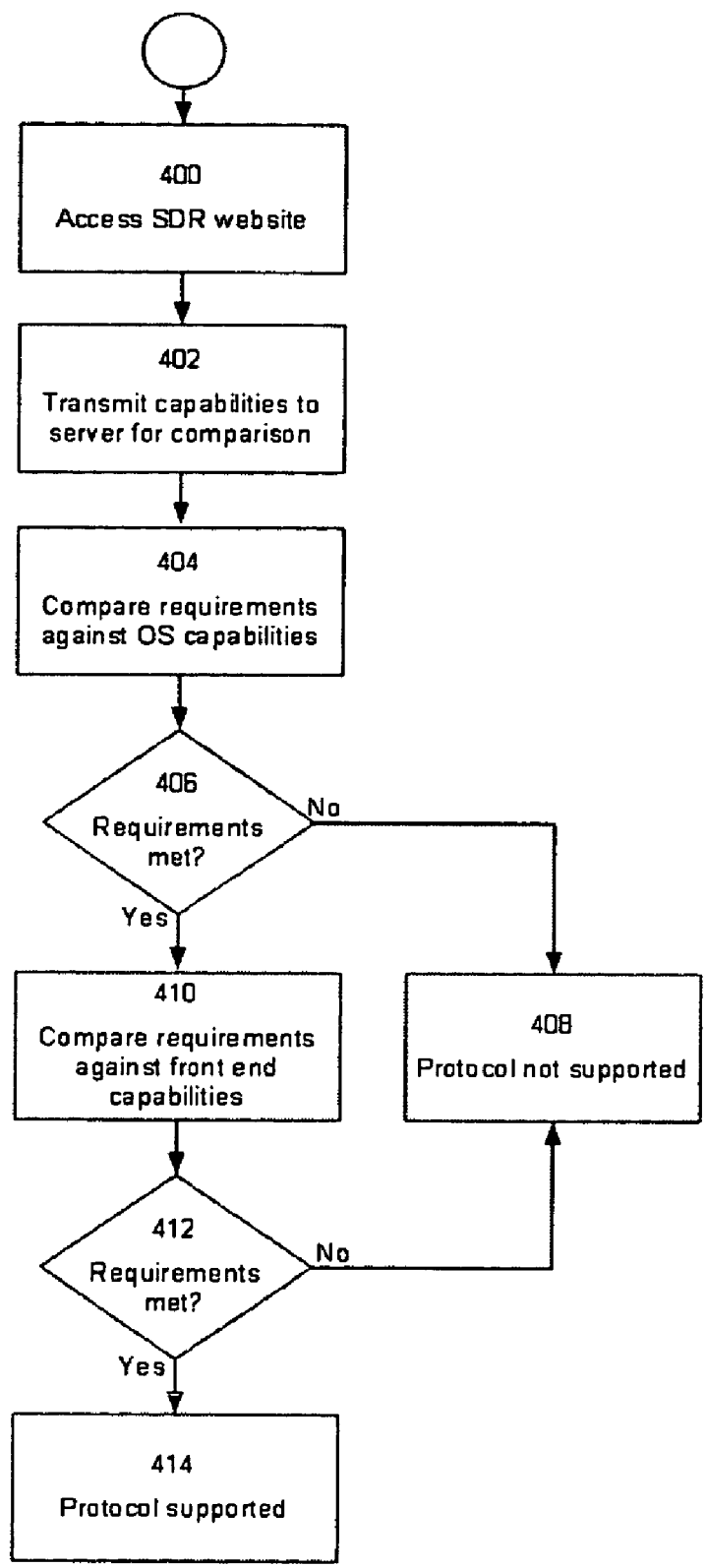
FIG. 4 is a flowchart of an illustrative process of discovering, on a remote server, whether a specified wireless protocol is supported by a computing device's software and hardware, in accordance with one embodiment of the invention.

FIG. 4 illustrates a process for performing a remote comparison of system capabilities and protocol requirements in accordance with one embodiment of the invention. In act 400, a user accesses an SDR website (e.g., one of the type described above). In act 402, the capabilities of the computer system (e.g., OS and the front end) are transmitted to the server for comparison. This can be done in any suitable manner. As an example, the user may upload a file (or files) comprising data compiled by the computer (e.g., by the operating system) concerning the capabilities of the OS and/or the front end, or the website may execute a computer program on the computing device to send such a file (or files) to the server. In one embodiment, the computer program executed by the website on the computing device gathers the information comprising the file(s) by querying the OS 214 and front end 202 before sending the files to the server. In an alternative embodiment, a computing device may transmit a file to the server that comprises the capabilities of another computing device, to determine compatibility of the other computing device with wireless protocols.

In act 404, the requirements of a protocol are compared against the capabilities of the user's operating system. In act 406, the process determines whether the protocol requirements are met. If the requirements are not met, the protocol is determined to be unsupported in act 408. Similar to the process illustrated in FIG. 3, act 408 may include displaying a message to the user indicating that the protocol is not supported. If the process determines that the protocol is supported by the operating system, however, it proceeds to act 410 wherein the protocol's requirements are compared to the capabilities of the front end hardware. In act 412, the process determines whether the requirements are met by the front end, and if not it proceeds to act 408 where a message may be presented to the user indicating that the protocol is not supported, as described above. If it is determined in act 410 that the requirements are met by the front end, the process proceeds to act 414 where the protocol is identified as supported. Act 414 may comprise a message to the user indicating that the protocol is supported, may comprise downloading to the user's computing device the software to program the SDR on the computer to support the wireless protocol, or any other suitable identification.

The exemplary process illustrated in FIG. 4 may be used in conjunction with any suitable technique for selecting a wireless protocol, and is not limited in this respect. Similar to the process of FIG. 3, the process of FIG. 4 may be initiated by a user selecting a protocol from the website, the requirements of which are then compared on the server to the uploaded capabilities file(s). In an alternative embodiment, once the capabilities of the computing device have been uploaded, the server may execute a selection process by which each protocol in the server's database of protocols may be compared to the capabilities file to determine which available protocols are supported by the computing device (e.g., adding protocols to a whitelist of supported protocols or a blacklist of unsupported protocols). The user may then examine the information for desired protocol(s) and download the software to enable communication according to any supported protocol. In one embodiment, the available protocols may be further pared by the protocol's intended use and/or location in much the same manner as described above.

It should be appreciated that the use of a website and web server in the embodiment illustrated in FIG. 4 is merely exemplary and that any technique may be used for exchanging information between a client and a server. An alternative embodiment may not use a website or web server at all, but rather the user may run software locally, on the computing device, to perform functions of the above-described website. This software may transmit the system's capabilities to a server via any suitable technique (e.g., different from the use of a browser and a web server), which may execute the above-described comparison and transmit back to the computing device the information identifying supported protocols for the user to select software implementing a protocol (or protocols) to be retrieved.

In addition, it should be appreciated that the sequence of acts of the embodiment illustrated in FIG. 4 is merely illustrative, as other sequences are possible. For example, rather than the OS capabilities being checked first, the front end capabilities could be checked first. Also, in some embodiments of the invention, only the OS or front end hardware (or other components) are checked for compatibility by the process, and not all components.

The illustrative process of FIGS. 3 and 4 can be implemented in any suitable way. For example, the embodiments of the invention that exchange data between a client computing device and a server are not limited to any specific technique for performing that data exchange. In one exemplary embodiment, data transfer is conducted using the Extensible Markup Language (XML). Using XML's tag system, data can be enclosed by tags indicating what data is stored therein, to allow the receiver to process what data it is receiving and to determine how to process it further. In this way, protocol requirements, in one embodiment, may be encoded in an XML file for transfer between the client computing device and server. In accordance with one embodiment, any remaining information that may be necessary for the software to configure the device to implement a requested protocol as discussed with regard to act 314 of FIG. 3 may be encoded in an XML file as well. Each of the protocol requirements and the system capabilities may be exchanged in multiple files instead of one file. The embodiment that employs multiple files is not limited to any particular division, but one exemplary division is a division between the requirements/capabilities of software versus hardware.

The invention is not limited to use with SDR systems that employ any specific division of functions between software (e.g., the operating system 214 and SDR drivers 216) and front end hardware 202. As described above, the front end may perform a minimum of radio functions and the bulk of the functions may be done in software, but embodiments of the invention are not limited to checking the capabilities of systems that employ that exemplary division.

In one embodiment of the invention, the capability of any of the parameters of the computer system necessary to connect to and communicate with another device according to a particular protocol may be checked. It should be appreciated that the invention is not limited to checking any particular set or subset of protocol parameters. As an example, in one embodiment, the capability checking tool may check for the supported minimum, maximum, and other desirable characteristics in one or more (including any combination of) these exemplary areas:

Total bandwidth
Granularity of carrier separation
Frequency bound
Granularity of center frequency
Granularity of generated signals
Sampling rate
Bits per sample
Effective Isotropic Radiated Power (EIRP)
Error control coding
Granularity of filtering
Type of filtering (e.g., analog filtering, digital filtering)
Encryption/decryption capabilities (e.g., capable key length)
Medium Access Control (MAC)

In one embodiment, the process may check all of these capabilities, but it may not be necessary in all cases to check all of these capabilities and alternative embodiments may check any combination of them. However, it should be appreciated that this list is merely illustrative, and embodiments of the invention may check other capabilities. Other illustrative capabilities that may be checked include generic support for SDR by the operating system (i.e., whether drivers or hardware are available); whether a particular protocol is in a whitelist (or blacklist) maintained by the operating system of protocols specifically supported (or not supported) by the version of the operating system installed on the computing device (i.e., whether an OS manufacturer has specifically disallowed certain protocols for users who have not downloaded a certain patch or update for the OS); or if software to implement a selected protocol is already installed on the computing device. It should also be appreciated that each of these parameters may involve examining capabilities of the OS 214, front end 202, or both. For example, in one embodiment of the invention the OS may be tested for MAC functionality and the front end may be tested for EIRP levels. Both may be tested, however, for maximum and minimum frequency levels. For example, some SDR may be implemented in which the OS modulates the signal to the desired frequency and passes it to the front end to be transmitted. In such an implementation, the OS must be capable of modulating to a given frequency and the front end must be capable of generating the given frequency.

In one embodiment, when checking for the capabilities of a computing device, the software implementing a protocol may dictate the parameters to be checked—which may be fewer than the system is capable of checking—and the process may only check these parameters for compatibility. As an example, the user may select to download software to implement the IEEE 802.11b wireless standard, and the capability checking may receive the elements of Table I as the required capabilities for implementing 802.11b.

TABLE I

| Received requirements of IEEE 802.11b | |  |
|---|---|---|
| Total Bandwidth | 83 | MHz |
| Lower Frequency | 2.4 | GHz |
| Upper Frequency | 2.483 | GHz |
| A/D rate | 30 | Msps |
| Bit per sample | 3 | |
| EIRP | 23 | dBm |

In one embodiment only the capabilities dictated by the requirements received and shown in Table I will be checked, even if the system has the ability to check for other capabilities (and checks for other capabilities when checking for other protocols). In response, the computing device can be examined (e.g., the OS and front end) and (in one exemplary configuration) the capabilities shown in Table II can be detected.

TABLE II

| Capabilities of Exemplary Computing Device | | |
|---|---|---|
| Total Bandwidth | 500 | MHz |
| Lower Frequency | 1.8 | GHz |
| Upper Frequency | 5.9 | GHz |
| A/D rate | 1 | Gsps |
| Bit per sample | 3 | |
| EIRP | 43 | dBm |

As can be seen by comparing the values in the tables, all the requirements of Table I are met by the capabilities of Table II. Thus, it will be determined that the exemplary computing device will be able to support IEEE 802.11b according to the requirements received.

In one embodiment of the invention, optional functions of a protocol (e.g., 802.11b) may not be checked to determine whether they are supported by the computing device (e.g., encryption). Alternatively, optional functions may also be considered in determining compatibility. As a further option, the process can provided a report to the user of whether the minimum requirements are supported and a list of optional functions that are or are not supported by the computing device.

It should be appreciated that the invention is not limited to comparing values contained within tables or lists, nor to comparing requirements and capabilities in any other manner. As discussed above, any suitable method for determining whether requirements are met by the computing device may be implemented.

Figure 5:
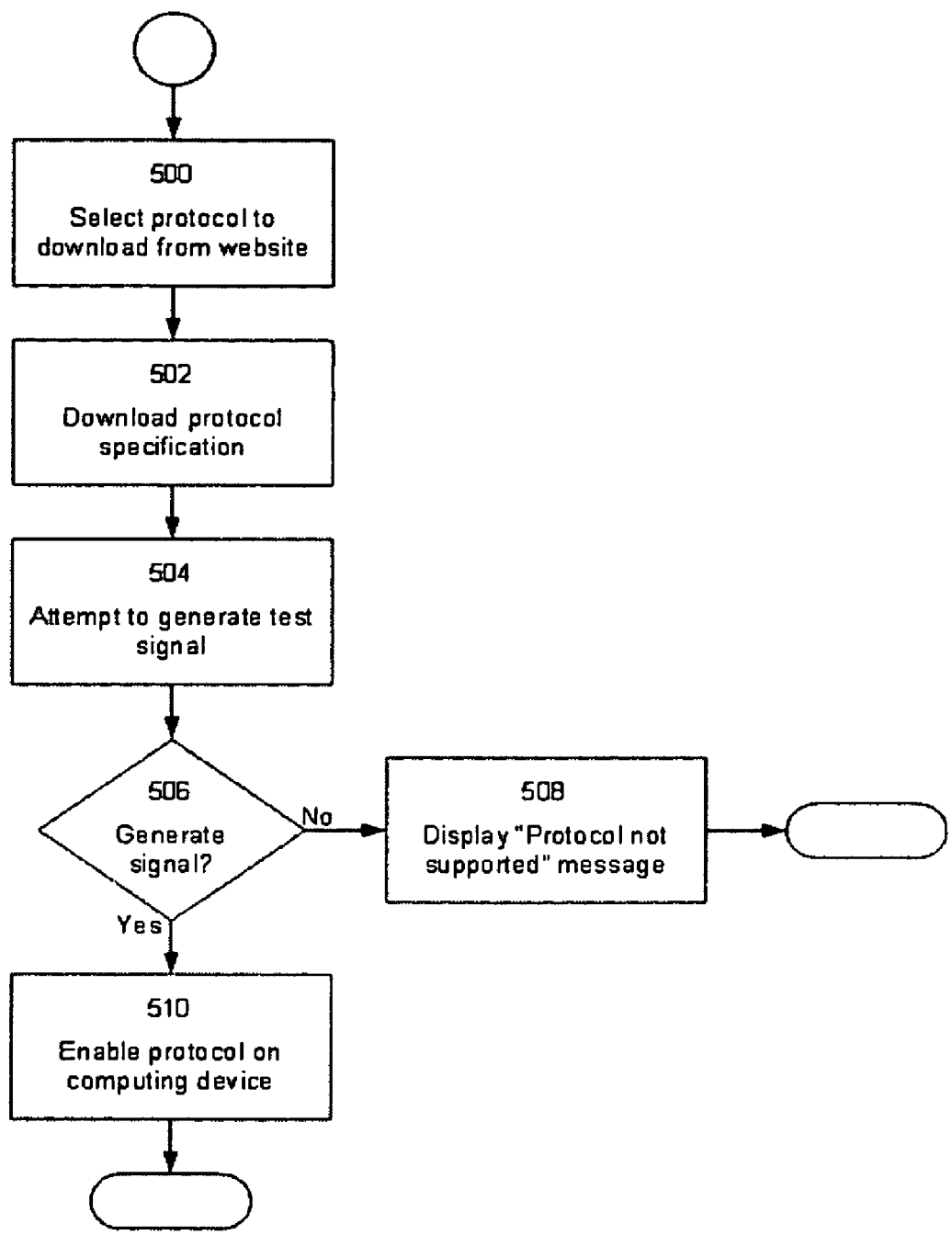
FIG. 5 is a flowchart of an illustrative process of generating test signals according to a specified wireless protocol to determine if the protocol is supported by the computing device's software and hardware.

In an alternative embodiment, the capability of a computing device is determined not by evaluating a list of one or more required capabilities, but by testing the computing device to determine its capabilities. FIG. 5 is an illustrative process for implementing this embodiment.

In act 500, the user selects a protocol for which enabling software is to be downloaded from a website. As with the embodiments described above, this may be done in any suitable manner, and the use of a website is merely illustrative. In act 502, the computing device downloads from the website the software to implement the selected protocol and installs it (e.g., for use with the OS 214 and SDR drivers 216). In act 504, the capability checking process begins determining support for the protocol by attempting to generate a test signal according to the protocol (e.g., within the specified frequency band). Any suitable type of test signal may be used. In one embodiment, the test signal may be generated at low power (e.g., below a specified noise threshold) because the test may not involve detection of the signal. In this respect, the test may involve the software attempting to transmit a signal that meets the protocol (e.g., within the frequency range) and checking to see if the system is capable of fulfilling that request or whether any component returns an error indicating that it is not capable. In another embodiment, the capability checking tool may generate a full signal and attempt to connect to another device (e.g., wireless access point 102).

In act 506 the capability checking tool determines whether the test succeeded. This determination may depend on the type of testing performed. For example, this determination may comprise checking for error signals from the hardware or software, or may comprise checking to see if communication has been established with another device.

Depending on the determination of act 506, the capability checking tool may display a message in act 508 indicating that the protocol is not supported, or may enable the protocol for communication on the computing device in act 510. In one embodiment, a determination of a successful test may also result in a message being displayed to the user indicating a successful test.

Other suitable techniques for testing a computing device to detect whether it is capable of supporting a protocol may be implemented. For example, the computing device may have the software loaded therein and a test may be done to see if it can receive signals sent according to the protocol. A capability check may then wait for error codes from the device's components as above, or may wait for detection of a control/beacon signal or data signals from wireless access point 102 or another computing device.

It should be appreciated that multiple test signals may be generated rather than a single test signal. In one embodiment, a different test signal may be generated for each parameter having a minimum or maximum value required by the wireless protocol. In this embodiment, a test signal can be generated for each of power requirements, bandwidth requirements, data rate requirements, frequency requirements, and so on. In another embodiment, the capability checking tool may generate a range of signals for each requirement. For example, if a protocol requires that the computing device support frequencies between 1.0 GHz and 3.0 GHz, the capability checking tool may generate signals between a value at or below 1.0 GHz and a value at or above 3.0 GHz. In this way, the capability checking tool may gather more information about the capabilities of the computing device than simply whether it supports the extreme values of the protocol. In accordance with embodiments of the invention, if a particular test signal fails, the capability checking tool may determine that the computing device cannot support the protocol, or may determine that the protocol may not operate at a particular level on the device.

It should be appreciated that some protocols may have not only minimum requirements but also "recommended requirements." Using the example above, a protocol may specify communication frequencies between 1.0 GHz and 3.0 GHz for peak performance, but may also specify that the protocol may operate—at a reduced speed, for example—on frequencies between 1.5 GHz and 2.5 GHz. In one embodiment of the invention, acts 314, 414, and 510 of FIGS. 3, 4, and 5, respectively, may comprise displaying messages to the user indicating that the selected protocol may run on the computing device, but not at certain levels of performance.

Applicants have also appreciated that selecting a particular protocol may involve more than just determining whether a device meets the minimum requirements and recommended requirements of a protocol. For example, the intended use of the protocol may be a consideration. Different uses for communication networks have widely different demands on those networks. For example, a protocol may require a minimum or recommended bandwidth of 83 MHz to run under normal conditions (e.g., exchanging simple, text-based messages between the device and a web server) on a computing device, but may require a bandwidth of 100 MHz to run effectively when transferring large amounts of time-sensitive data (e.g., streaming audio or video). In one embodiment of the invention, a user may be prompted for additional information (e.g., intended uses) or presented with additional information (e.g., recommended uses given the capabilities of the computing device) to provide the user with more information than whether a protocol is supported, but also whether it is well-suited for use on the computing device for the user's intended purpose.

Figure 6:
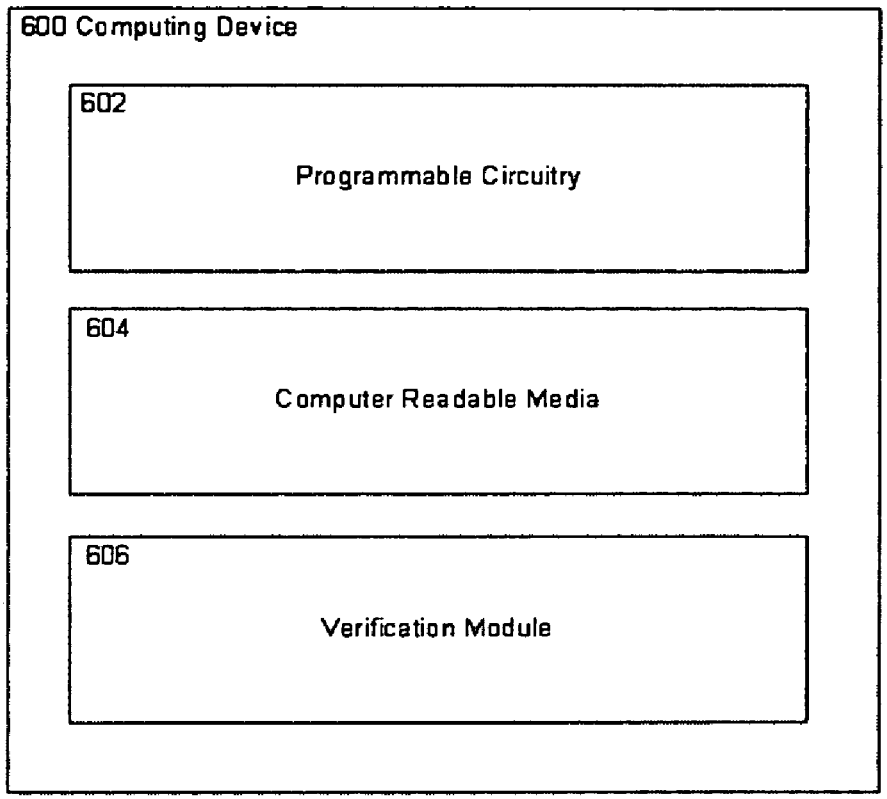
FIG. 6 is one exemplary computing device that may be used in accordance with embodiments of the invention.

FIG. 6 schematically illustrates one exemplary computing device 600 that may be used in accordance with embodiments of the invention. Computing device 600 comprises programmable circuitry 602, computer readable media 604, and a verification module 606. Programmable circuitry 602 may be programmable by control instructions to generate and/or receive signals according to a wireless protocol. This programmable circuitry can take any suitable form, examples of which are described above (e.g., front end hardware 202 and SDR drivers 216) and include any collection of directly programmable circuitry (e.g., a programmable processor) and circuitry that interacts with directly programmable circuitry to enable communication according to a wireless protocol. Computer readable media 604 may comprise one or more storage media of any type, and may store data comprising instructions for implementing and/or configuring a software defined radio. For example, computer readable media 604 may store control instructions to program programmable circuitry 602.

Verification module 606 may determine whether a software defined radio (e.g., implemented by components comprising front end 202, OS 214, and SDR drivers 216 or any other suitable way) is able to communicate according to a specified wireless protocol. This determination may be made using any of the exemplary techniques discussed above in conjunction with FIGS. 3, 4, and 5—or using any other technique—as embodiments of the invention can make this determination in any suitable manner. It should also be appreciated that while FIG. 6 illustrates verification module 606 as separate from computer-readable media 604 and the programmable circuitry 602, verification module 606 may be implemented in any suitable manner, including using software (encoded, for example, on computer readable media 604), hardware (including, for example, parts or all of programmable circuitry 602), or any combination thereof.

The above-described embodiments of the present invention can be implemented in any of numerous ways. For example, the embodiments may be implemented using hardware, software, or a combination thereof. When implemented in software, the software code can be executed on any suitable processor or collection of processors, whether provided in a single computer or distributed among multiple computers.

Further, it should be appreciated that a computer or terminal may be embodied in any of a number of forms, such as a rack-mounted computer, a desktop computer, a laptop computer, or a tablet computer. Additionally, a computer or terminal may be embedded in a device not generally regarded as a computer but with suitable processing capabilities, including a Personal Digital Assistant (PDA), a smart phone, or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible formats.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks, or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method comprising acts of:
   (A) obtaining first information comprising requirements for device communication according to a wireless communication protocol;
   (B) obtaining second information about at least one capability of a computing device, the second information being sufficient to determine whether the computing device is capable of implementing a software defined radio that can communicate according the wireless communication protocol, the at least one capability comprising at least one capability of hardware of the computing device; and
   (C) determining, based on the first and second information, whether the computing device is capable of implementing a software defined radio that can communicate according the wireless communication protocol.

2. The method of claim 1, wherein the computing device comprises hardware components and software components; and
   wherein the act (C) comprises an act of comparing the first and second information to determine if the at least one capability of the computing device is within a range determined by the requirements for device communication.

3. The method of claim 2, wherein the at least one capability comprises at least one capability selected from a group consisting of total bandwidth, granularity of carrier separation, modulation range, support for error control coding, granularity of filtering, type of filtering, support for encryption and/or decryption, and support for medium access control.

4. The method of claim 2, wherein the at least one capability comprises total bandwidth, granularity of carrier separation, modulation range, support for error control coding, granularity of filtering, type of filtering, support for encryption and/or decryption, and support for medium access control.

5. The method of claim 1, wherein the act (B) comprises at least attempting to implement a software defined radio that communicates at least one signal complying with at least one requirement of the wireless communication protocol, and wherein the second information comprises a message indicating whether any error messages are generated by components of the computing device in response.

6. The method of claim 5, wherein the act (B) comprises at least attempting to transmit the at least one signal such that characteristics of the signal are below predetermined thresholds.

7. The method of claim 5, wherein the act (B) comprises an act of at least attempting to receive at least one signal transmitted according to the wireless communication protocol, and wherein the second information comprises a message indicating whether the at least one signal was received.

8. The method of claim 1, wherein the first information comprises information describing a feature of the wireless communication protocol and a desired level of service quality for the feature; and
wherein the method further comprises an act of determining, based on the first and second information, if the software defined radio is capable of performing the feature at the desired level of service quality.

9. At least one computer-readable medium encoded with instructions for execution on a computer, wherein the instructions, when executed, perform a method comprising acts of:
(A) obtaining first information comprising requirements for device communication according to a wireless communication protocol;
(B) obtaining second information about at least one capability of a computing device, the second information being sufficient to determine whether the computing device is capable of implementing a software defined radio that can communicate according the wireless communication protocol, the at least one capability comprising at least one capability of software of the software defined radio and at least one capability of hardware of the computing device; and
(C) determining, based on the first and second information, whether the computing device is capable of implementing a software defined radio that can communicate according the wireless communication protocol.

10. The computer-readable medium of claim 9, wherein the act (C) further comprises an act of comparing the first and second information to determine if the at least one capability of the computing device is within a range determined by the requirements for device communication.

11. The computer-readable medium of claim 10, wherein the at least one capability comprises at least one capability selected from a group consisting of total bandwidth, granularity of carrier separation, modulation range, support for error control coding, granularity of filtering, type of filtering, support for encryption and/or decryption, and support for medium access control.

12. The computer-readable medium of claim 9, wherein the act (B) comprises at least attempting to implement a software defined radio that communicates at least one signal complying with at least one requirement of the wireless communication protocol, and wherein the second information comprises a message indicating whether any error messages are generated by components of the computing device in response.

13. The computer-readable medium of claim 12, wherein the act (B) comprises at least attempting to transmit the at least one signal such that characteristics of the signal are below predetermined thresholds.

14. The computer-readable medium of claim 12, wherein the act (B) comprises an act of attempting to receive at least one signal transmitted according to the wireless communication protocol, and wherein the second information comprises a message indicating whether the at least one signal was received.

15. The computer-readable medium of claim 9, wherein the first information comprises information describing a feature of the wireless communication protocol and a desired level of service quality for the feature; and
wherein the method further comprises an act of determining, based on the first and second information, if the software defined radio is capable of performing the feature at the desired level of service quality.

16. An apparatus comprising:
a software-defined radio comprising:
hardware components to perform first operations for generating a radio signal; and
at least one memory storing computer-executable instructions defining at least one software-defined radio driver and adapted to perform second operations for generating the radio signal; and
at least one processor adapted to:
obtain first information comprising requirements for device communication according to a wireless communication protocol;
obtain second information about at least one capability of the software-defined radio, the second information being sufficient to determine whether the software-defined radio is capable of communicating according the wireless communication protocol, the at least one capability comprising at least one capability of the hardware components of the software defined radio; and
determine, based on the first and second information, whether the software defined radio is capable of communicating according the wireless communication protocol.

17. The apparatus of claim 16, wherein the at least one process is adapted to determine whether the software-defined radio is capable by comparing the first and second information to determine if the at least one capability of the software-defined radio is within a range determined by the requirements for device communication.

18. The apparatus of claim 16, wherein the at least one capability comprises total bandwidth, granularity of carrier separation, modulation range, support for error control coding, granularity of filtering, type of filtering, support for encryption and/or decryption, and support for medium access control.

19. The apparatus of claim 16, wherein the at least one processor is adapted to obtain second information about the capability of the software-defined radio by attempting to implement a software-defined radio that communicates at least one signal complying with at least one requirement of the wireless communication protocol, and wherein the second information comprises a message indicating whether any error messages are generated by components of the software-defined radio in response.

20. The apparatus of claim 16, wherein the first information comprises information describing a feature of the wireless communication protocol and a desired level of service quality for the feature; and
wherein the at least one processor is further adapted to determine, based on the first and second information, if the software-defined radio is capable of performing the feature at the desired level of service quality.

* * * * *